US006488371B2

(12) United States Patent
Kosaka et al.

(10) Patent No.: US 6,488,371 B2
(45) Date of Patent: Dec. 3, 2002

(54) PRINTING METHOD, INK JET PRINTER AND TAPE CARTRIDGE FOR USE WITH INK JET PRINTER

(75) Inventors: Zenta Kosaka, Matsumoto (JP); Shinichi Nagashima, Chino (JP)

(73) Assignee: Seiko Epson Corporation, Tokyo (JP)

( * ) Notice: Subject to any disclaimer, the term of this patent is extended or adjusted under 35 U.S.C. 154(b) by 56 days.

(21) Appl. No.: 09/727,399

(22) Filed: Nov. 30, 2000

(65) Prior Publication Data

US 2002/0135622 A1 Sep. 26, 2002

(30) Foreign Application Priority Data

Dec. 7, 1999 (JP) .......................................... 11-348209

(51) Int. Cl.[7] ............................ B41J 2/01; G01D 15/24
(52) U.S. Cl. ........................ 347/104; 347/105; 346/136
(58) Field of Search .......................... 346/136; 347/105, 347/104; 400/625, 634, 500, 614; 242/346; 156/749

(56) References Cited

U.S. PATENT DOCUMENTS 5,893,526 A * 4/1999 Zwettler ..................... 242/346
6,186,684 B1 * 2/2001 Bane et al. ................. 400/614
6,187,128 B1 * 2/2001 Oosterlinck ................ 156/249

FOREIGN PATENT DOCUMENTS

JP 9-71947 3/1994 ................. 347/136

* cited by examiner

*Primary Examiner*—Raquel Yvette Gordon
*Assistant Examiner*—Charles W. Stewart, Jr.
(74) *Attorney, Agent, or Firm*—Hogan & Hartson, LLP

(57) ABSTRACT

There are provided a printing method and an ink jet printer which are capable of attaining the energy saving and reduced installation space as well as implementing high speed printing, and a tape cartridge for use with the ink jet printer. Printing is sequentially carried out on a printing tape having a printing area whose width is sufficiently larger than a length of nozzle arrays of an ink jet head, along the width of the printing tape by the nozzle arrays extending in the direction of the width of the printing tape. The printing tape is fed such that it is reciprocatingly moved, and at the same time the ink jet head facing the printing tape is intermittently moved in a direction orthogonal to the direction of feed of the printing tape, thereby printing on the printing tape by the ink jet head.

21 Claims, 15 Drawing Sheets

PRINTING METHOD, INK JET PRINTER AND TAPE CARTRIDGE FOR USE WITH INK JET PRINTER

BACKGROUND OF THE INVENTION

1. Field of the Invention

This invention relates to a printing method and an ink jet printer which are capable of printing on a printing medium by using an ink jet head, as well as a tape cartridge for use with the ink jet printer.

2. Prior Art

FIG. 15 shows a conventional printing method using an ink jet head. As shown in the figure, in the conventional printing method, an ink jet head H installed on a carriage is caused to reciprocate (for main scanning), and in synchronism with this reciprocation of the ink jet head H, a printing paper (printing medium) P is intermittently fed (for sub scanning) in a direction orthogonal to the direction of reciprocation of the ink jet head H, whereby printing is carried out.

As described above, in the conventional printing method, in order to increase printing speed, it is required to cause the ink jet head to reciprocate at an increased speed and with higher accuracy. In other words, the ink jet head which is relatively heavy in weight is required to be moved at a higher speed, and hence it is necessary to use a motor having a higher output power as a drive source. This results in increased power consumption. Further, since the ink jet head is moved at a high speed, fixed regions for acceleration and deceleration are required when the ink jet head undergoes transition from a standing state to a state moving at a constant speed, and transition from the latter to the former, which make it necessary to secure spaces for acceleration and deceleration of the ink jet head.

SUMMARY OF THE INVENTION

It is an object of the invention to provide a printing method and an ink jet printer which are capable of attaining the energy saving and reduced installation space as well as implementing high speed printing, and a tape cartridge for use with the ink jet printer.

To attain the above object, according to a first aspect of the invention, there is provided a method of sequentially printing on a printing medium having a printing area whose width is sufficiently larger than a length of nozzle arrays of a print head, along a width of the printing medium, by the nozzle arrays extending in a direction of the width of the printing medium.

The method according to the first aspect of the invention is characterized in that the printing on the printing medium is carried out while feeding the printing medium such that the printing medium is reciprocatingly moved, and at the same time intermittently moving the print head facing the printing medium in the direction of the width of the printing medium, the direction being orthogonal to a direction of feed of the printing medium.

According to this method, the printing medium is caused to reciprocate, and the print head is intermittently moved. That is, by setting the direction of reciprocation of the printing medium to the direction of main scanning, and the direction of intermittent movement of the print head to the direction of sub scanning, printing is sequentially carried out in the direction of the width of the printing area, so that the printing speed mainly depends on the reciprocating speed of the printing medium. The printing medium is lighter in weight and more flexible than the print head, whereby it is possible to save power consumption and shorten acceleration/deceleration distances required in the reciprocating motion, thereby attaining the saving of energy and printing space. Further, even if a simple construction (using rollers, for instance) is employed, it is possible to cause the printing medium to reciprocate at a high speed.

Preferably, the printing by using the print head is carried out not only when the printing medium is moved forward but also when the printing medium is moved rearward.

According to this preferred embodiment, it is possible to prevent a wasteful motion of the printing medium, thereby causing the same to reciprocate efficiently.

Preferably, the print head is caused to reciprocate over the printing area, and the printing is carried out not only when the print head is moved forward but also when the print head is moved rearward.

According to this preferred embodiment, it is possible to prevent a wasteful motion of the printing medium which is relatively heavy in weight, thereby moving the same efficiently.

Preferably, the printing medium is a printing tape which is stored in a form of a roll and rolled out for the printing.

According to this preferred embodiment, especially when a printing tape having a small width is used, the whole distance over which the print head is intermittently moved can be reduced, and by increasing the speed of the reciprocation of the printing tape while providing means for preventing jamming of the tape, it is possible to increase the printing speed with ease.

To attain the above object, according to a second aspect of the invention, there is provided an ink jet printer comprising:

a printing medium feed mechanism for feeding a printing medium having a printing area upon which printing is carried out, such that the recording medium is reciprocatingly moved;

a print head having nozzle arrays extending in a direction of a width of the printing medium, and being brought to the printing medium whose width is sufficiently larger than a length of the nozzle arrays, for sequentially printing thereon along the width of the printing medium, by the nozzle arrays; and a head-moving mechanism for intermittently moving the print head in the direction of the width of the printing medium, the direction being orthogonal to a direction of feed of the printing medium, wherein the printing is carried out by causing the printing medium to be reciprocatingly moved and at the same time causing the print head to be intermittently moved.

According to this ink jet printer, the recording medium is caused to reciprocate by the recording medium feed mechanism, and the print head is driven (for ejecting ink droplets) while being intermittently moved by the head-moving mechanism, whereby printing on the printing tape is carried out as desired. That is, by setting the direction of reciprocation of the printing medium to the direction of main scanning, and the direction of intermittent movement of the print head to the direction of sub scanning, printing is sequentially carried out in the direction of the width of the printing area, so that the printing speed mainly depends on the reciprocating speed of the printing medium. The printing medium is lighter in weight and more flexible than the print head, whereby it is possible to save power consumption and shorten acceleration/deceleration distances required in the reciprocating motion, thereby attaining the saving of energy and printing space. Further, even if a simple construction (using rollers, for instance) is employed, it is possible to cause the printing medium to reciprocate at a high speed.

Preferably, the printing medium feed mechanism includes forward feed roller means and rearward feed roller means arranged at respective downstream and upstream locations in the direction of feed of the printing medium with respect to the print head, and the forward feed roller means is configured such that the forward feed roller means rotates slightly faster than the rearward feed roller means, and is permitted to perform slip rotation when the printing medium is moved forward, and at the same time to perform free rotation when the printing medium is moved rearward.

According to this preferred embodiment, the distance over which the printing medium reciprocates and the speed at which the same moves for reciprocation is controlled by the rearward feed roller means. When the printing medium is moved forward, the forward feed roller means cooperates with the rearward feed roller means to feed the printing medium forward, and performs slight slip rotation for giving a constant tension to the printing medium. On the other hand, when the printing medium is moved rearward, the forward feed roller means rotates freely while the rearward feed roller means rotates reversely. This enables excellent printing operation and smooth reciprocation of the printing medium.

More preferably, the rearward feed roller means includes a drive roller and a driven roller opposed to each other with the printing medium positioned therebetween, and out of the drive roller and the driven roller, one roller positioned on a recording surface side of the printing medium has a pair of roller bodies which are located outside the printing area, and brought into direct contact with the printing medium.

According to this preferred embodiment, in the rearward feed roller means having a drive roller and a driven roller for feeding the printing medium such that the recording medium is reciprocatingly moved, one of the rollers positioned on the recording surface side of the printing medium has a pair of roller bodies which are located outside the printing area. Therefore, the pair of roller bodies are not brought into contact with a printed portion of the printing medium when the printing medium is fed such that it is reciprocatingly moved. That is, the rearward feed roller means for causing the printing medium to reciprocate is prevented from being brought into contact with a portion having ink droplets ejected thereon, of the printing medium. This makes it possible to prevent the rearward feed roller means from being stained by ink, and at the same time prevent ink from being attached to the printing medium via the rearward feed roller means. Further, there is no need to reduce the printing speed in view of drying of ink.

Further preferably, the ink jet printer further includes a longitudinally-cutting cutter for cutting the printing medium for which the printing has been completed, at a location inward of a portion of the printing medium with which the pair of roller bodies are brought into rolling contact, along the direction of feed of the printing medium.

According to this preferred embodiment, a printing medium having a predetermined width can be used for producing a printing medium having a printed portion and a desired width. This makes it unnecessary to provide an ink jet printer which is capable of receiving a plurality of kinds of printing mediums having difference widths. Further, after the printing medium is printed with predetermined background colors, if the printing medium is cut to have a slightly smaller width than the printing width, it is possible to obtain a cut-off strip of the printing medium having a background painted all over.

Still more preferably, the longitudinally-cutting cutter has a pair of cutter blades, the pair of cutter blades being constructed such that a distance therebetween can be adjusted.

According to this preferred embodiment, each printing medium can be freely cut to have a desired width. Further, it is possible to automatically set a cutting width relative to a printing width by taking margins into account.

Still more preferably, the printing medium has an adhesive layer coated on a reverse side surface opposite to the recording surface and a peel-off paper provided on the adhesive layer, wherein the longitudinally-cutting cutter performs half-cutting of the printing medium such that the peel-off paper is left uncut.

According to this preferred embodiment, a printed portion of the printing medium, which has the same width as its original width, is sent out of the ink jet printer in a manner held by the peel-off paper. The printed portion cut to have a desired width is peeled off the peel-off paper. This makes it easy to deal with a printed portion of the printing medium.

Preferably, the print head is installed on a carriage, and the head-moving mechanism has a screw shaft in screw engagement with the carriage, a guide shaft in slidable engagement with the carriage, and a motor for rotating the screw shaft.

According to this preferred embodiment, the motor as a drive source and a screw mechanism formed between the screw shaft and an engagement portion of the carriage are used to intermittently move the print head, so that the head-moving mechanism having a compact and simple construction can intermittently move the print head with accuracy.

Preferably, the ink jet printer further includes a buffer for receiving a returned portion of the printing medium when the printing medium is moved rearward.

According to this preferred embodiment, it is possible to suitably protect the returned portion of the printing medium, and at the same time effectively prevent the returned portion from causing jamming or the like inconveniences.

Preferably, the printing medium is a printing tape which is stored in a form of a roll and rolled out for the printing.

According to this preferred embodiment, especially when a printing tape having a small width is used, the whole distance over which the print head is intermittently moved can be reduced, and by increasing the speed of the reciprocation of the printing tape while providing means for preventing jamming of the tape, it is possible to increase the printing speed with ease.

Preferably, the ink jet printer further includes a tape cartridge containing the printing tape, the tape cartridge being removably mounted in the ink jet printer.

According to this preferred embodiment, the printing tape in the form of a roll can be easily handled.

To attain the above object, according to a third aspect of the invention, there is provided a tape cartridge removably mounted in an ink jet printer that carries out printing by feeding a printing tape such that the printing tape is reciprocatingly moved, and at the same time by intermittently moving a print head facing the printing tape in a direction orthogonal to a direction of reciprocation of the printing tape, the tape cartridge comprising a cartridge casing accommodating the printing tape in a form of a roll.

Preferably, the cartridge casing is formed with an opening for allowing a returned portion of the printing tape to escape from within the cartridge casing when the printing tape is moved rearward.

According to this preferred embodiment, the printing tape is fed such that it is reciprocatingly moved, and at the same time the print head is intermittently moved, whereby it is possible to carry out printing by an ink jet printing method in which the printing tape is moved for main scanning, and the print head is moved for sub scanning. Further, the printing tape is contained in the cartridge casing to facilitate handling of the printing tape, and the cartridge casing is formed with an opening for allowing a portion of the printing tape being printed and returned by a rearward movement of the printing tape to be suitably escape out of the cartridge casing. This makes it unnecessary to take up the returned portion of the printing tape within the cartridge casing, so that the construction of a tape core or the like can be simplified, and the jamming of the printing tape in the cartridge casing can be prevented.

Preferably, the cartridge casing is provided with a guide member for guiding the returned portion of the printing tape out of the cartridge casing through the opening.

According to this preferred embodiment, it is possible to smoothly guide the returned portion of the printing tape out of the cartridge casing through the opening, thereby inhibiting the returned portion from returning toward the tape core.

Preferably, the printing tape is fed such that the printing tape is reciprocatingly moved by tape feed roller means having a drive roller and a driven roller, and the cartridge casing contains the driven roller.

According to this preferred embodiment, when the tape cartridge itself is mounted in the ink jet printer, the printing tape can be automatically held between the drive roller and the driven roller, thereby enabling and maintaining a feed wait state of the printing tape.

More preferably, the tape feed roller means comprises forward feed roller means and rearward feed roller means arranged at respective downstream and upstream locations in a direction of feed of the printing tape with respect to the print head, the forward feed roller means and the rearward feed roller means each comprising the drive roller and the driven roller arranged in a manner opposed to each other with the printing tape sandwiched therebetween.

The above and other objects, features, and advantages of the invention will become more apparent from the following detailed description taken in conjunction with the accompanying drawings.

DETAILED DESCRIPTION

The invention will now be described in detail with reference to the drawings showing an embodiment thereof. In the embodiment, a printing method, an ink jet printer, and a tape cartridge according to the invention are applied to a tape printing apparatus. The tape printing apparatus is capable of carrying out color printing of desired characters and the like entered via a keyboard of the apparatus, on a printing tape T by an ink jet printing method as well as cutting off the printed portion of the printing tape to a desired width and length, thereby producing a label. In this embodiment, the printing tape is a release paper-attached tape, and provided in a state wound in the form of a roll and contained in the tape cartridge.

Figure 1:
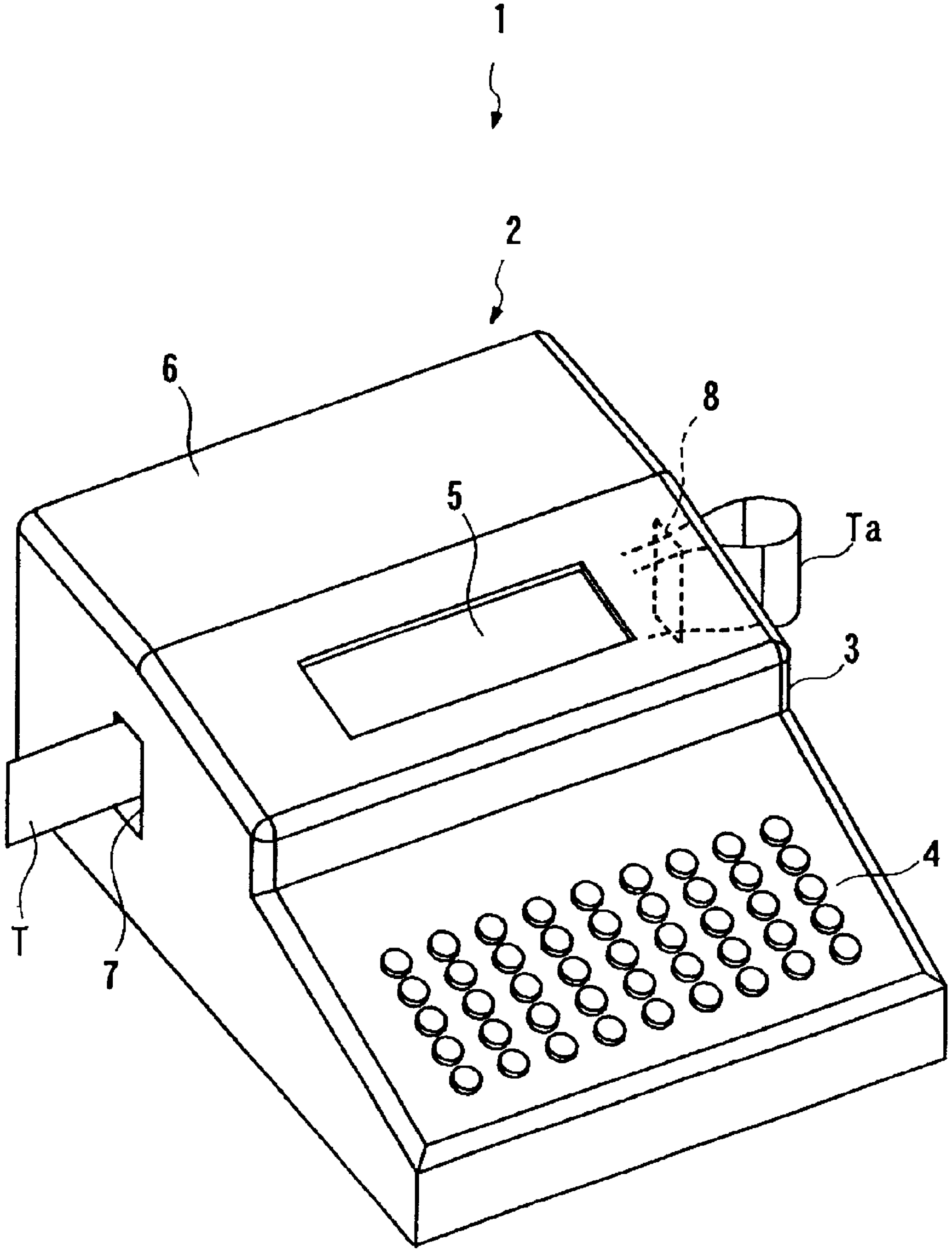
FIG. 1 is a perspective view of an appearance of a tape printing apparatus according to an embodiment of the invention.

FIG. 1 is a perspective view of an appearance of the tape printing apparatus. As shown in the figure, the tape printing apparatus 1 is comprised of an apparatus casing 3 housing a main unit 2 of the apparatus, a keyboard 4 arranged at a front portion thereof, a display 5 arranged at an intermediate portion thereof, and a lid 6 arranged at a rear portion thereof. Further, the apparatus casing 3 has a left side portion thereof formed with a tape exit 7 for discharging a printed portion of a printing tape (label) T, and a right side portion thereof formed with a buffer slit 8 for once allowing the printing tape T to escape from the apparatus 1 when the tape T is moved rearward (this rearward movement of the printing tape T will be described in detail hereinafter). The tape cartridge containing a roll of printing tape T and an ink cartridge containing four colors of ink are mounted in or removed from the main unit 2 when the lid 6 is opened.

Figure 2:
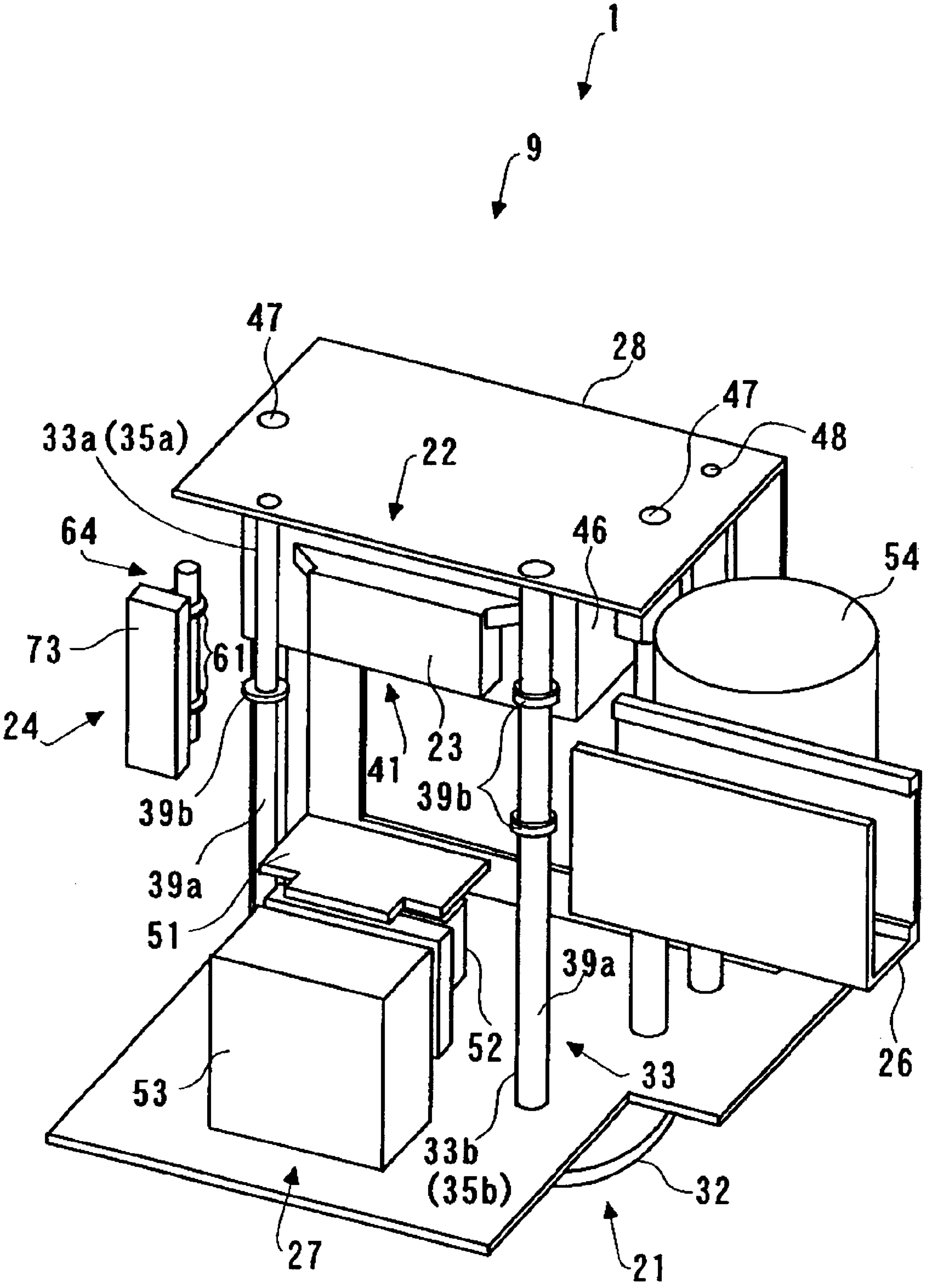
FIG. 2 is a perspective view of a main mechanism block (in a state of a tape cartridge removed from a main unit) of the tape printing apparatus.
Figure 3:
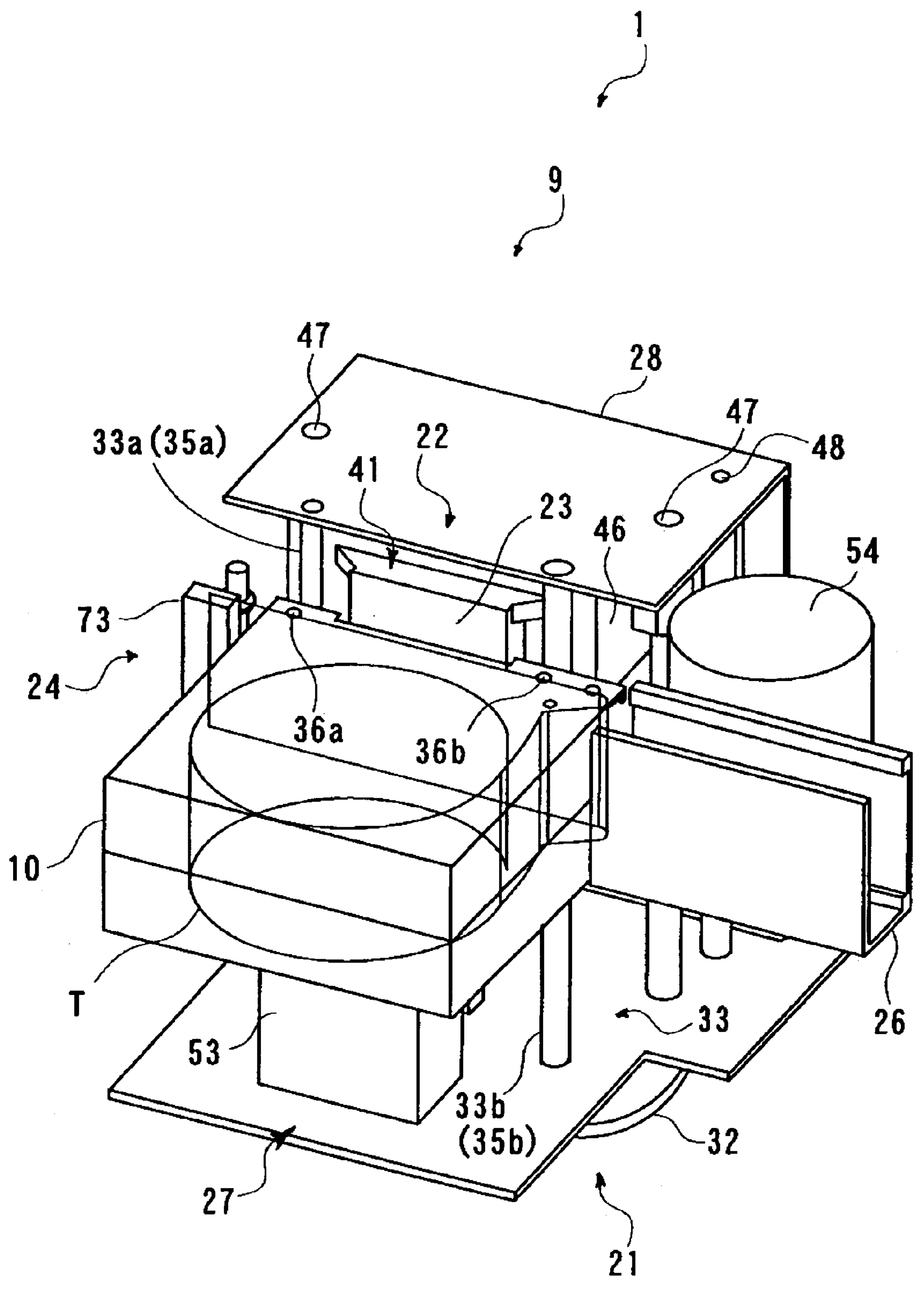
FIG. 3 is a perspective view of the main mechanism block (in a state of a tape cartridge loaded in the main unit) of the tape printing apparatus.
Figure 4:
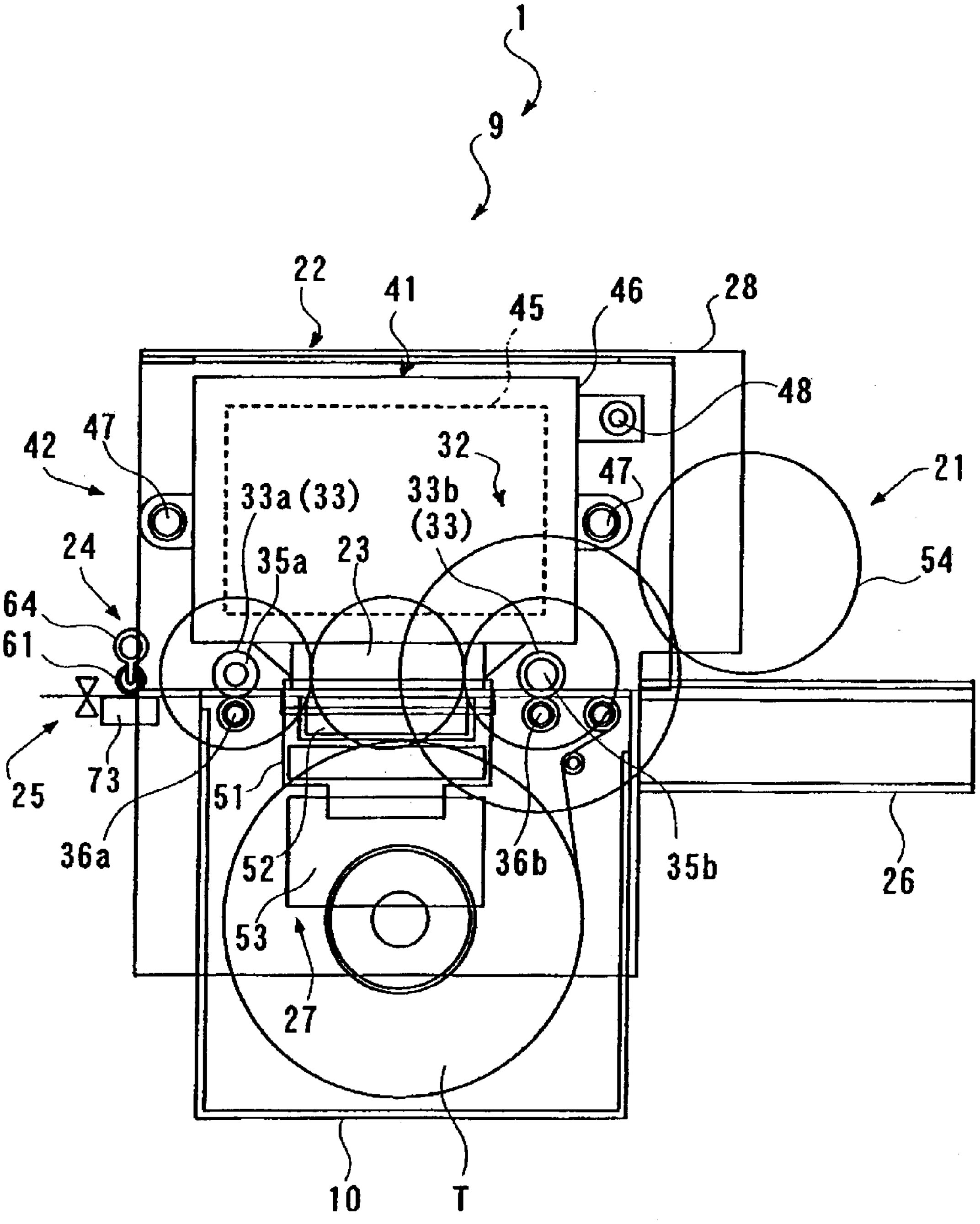
FIG. 4 is a transverse sectional view of the tape printing apparatus.
Figure 5:
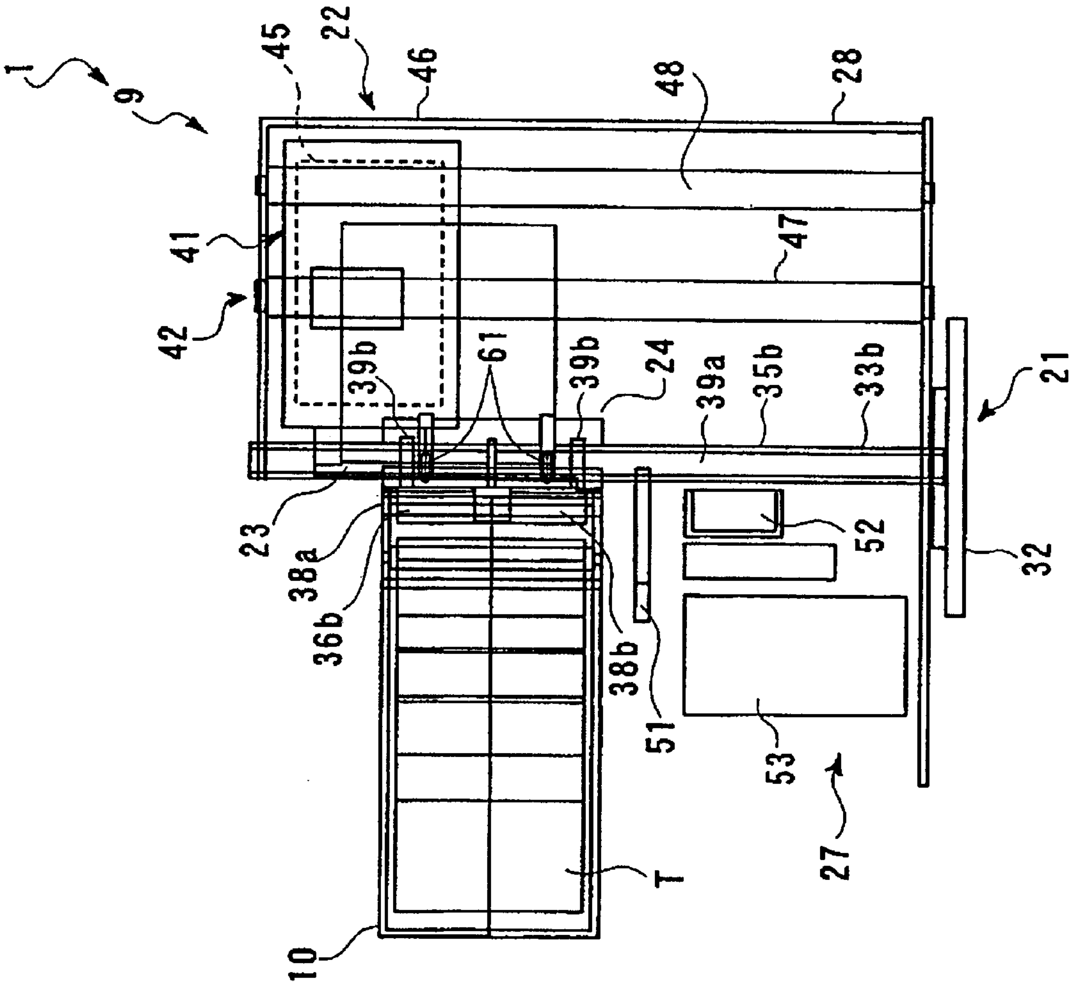
FIG. 5 is a longitudinal sectional view of the tape printing apparatus.

Next, a main mechanism block of the tape printing apparatus 1 will be described with reference to FIGS. 2 to 5. FIG. 2 shows, in perspective, the main mechanism block without the tape cartridge 10, while FIG. 3, in perspective, the main mechanism block with the tape cartridge 10 mounted therein. Further, FIG. 4 shows, in transverse section, the main mechanism block, and FIG. 5 shows the same in longitudinal section. As shown in the figures, the main mechanism block 9 is comprised of a tape feed mechanism 21 for feeding a printing tape T, a printing mechanism 22 including an ink jet head (print head) 23 for carrying out printing on the printing tape T by an ink jet printing method, a longitudinally-cutting cutter mechanism 24 for cutting a printed portion of the printing tape T to a predetermined width, a transversely-cutting cutter mechanism 25 for cutting a printed portion of the printing tape T to a predetermined length, a buffer 26 for receiving the printing tape T when it is moved rearward, a waste ink disposal mechanism 27 to which the ink jet head 23 is brought when a printing operation is idle or stopped, and an apparatus frame 28 supporting the above devices thereon.

The printing tape T, after being rolled out from the tape cartridge 10 by the tape feed mechanism 21, passes in front of the printing mechanism (ink jet head 23) 22 to be advanced toward the tape exit 7. Here, the printing tape T is caused to reciprocate in front of the ink jet head 23, as described herein after. The ink jet head 23 jet so rejects ink droplets in synchronism with the above reciprocating motion of the printing tape T while being intermittently moved in a direction orthogonal to the direction of feed of the printing tape T, for reciprocation therealong. Thus, the reciprocating motion of the printing tape T and that of the ink jet head 7 are repeatedly carried out for printing on the printing tape T as desired. After the printing is complete, the longitudinally-cutting cutter mechanism 24 cuts (performs half-cutting of) the printing tape T being advanced toward the tape exit 7, to a desired width. Further, the transversely-cutting cutter mechanism 25 fully cuts the printing tape T having been advanced, to a predetermined length, whereby a label having the width and length desired by the user is produced.

A returned portion of the printing tape T, which is produced as the printing tape T is moved rearward, is sent into the buffer 26 without being taken up by the tape cartridge 10. Further, when printing is not carried out, for instance, when a printing operation becomes idle or when the power is tuned off, the ink jet head 23 is brought to the waste ink disposal mechanism 27, for flushing, cleaning, sucking of ink, or the like.

Now, before describing each device in detail, for purposes of ease of understanding, innovative features of the printing method according to the embodiment will be explained in comparison with the conventional printing method, with reference to FIGS. 6 and 15. It should be noted that for clarity of description of operation of each block, a case is described by way of example in which not the printing tape T but a printing paper P is used as a printing medium.

Figure 15:
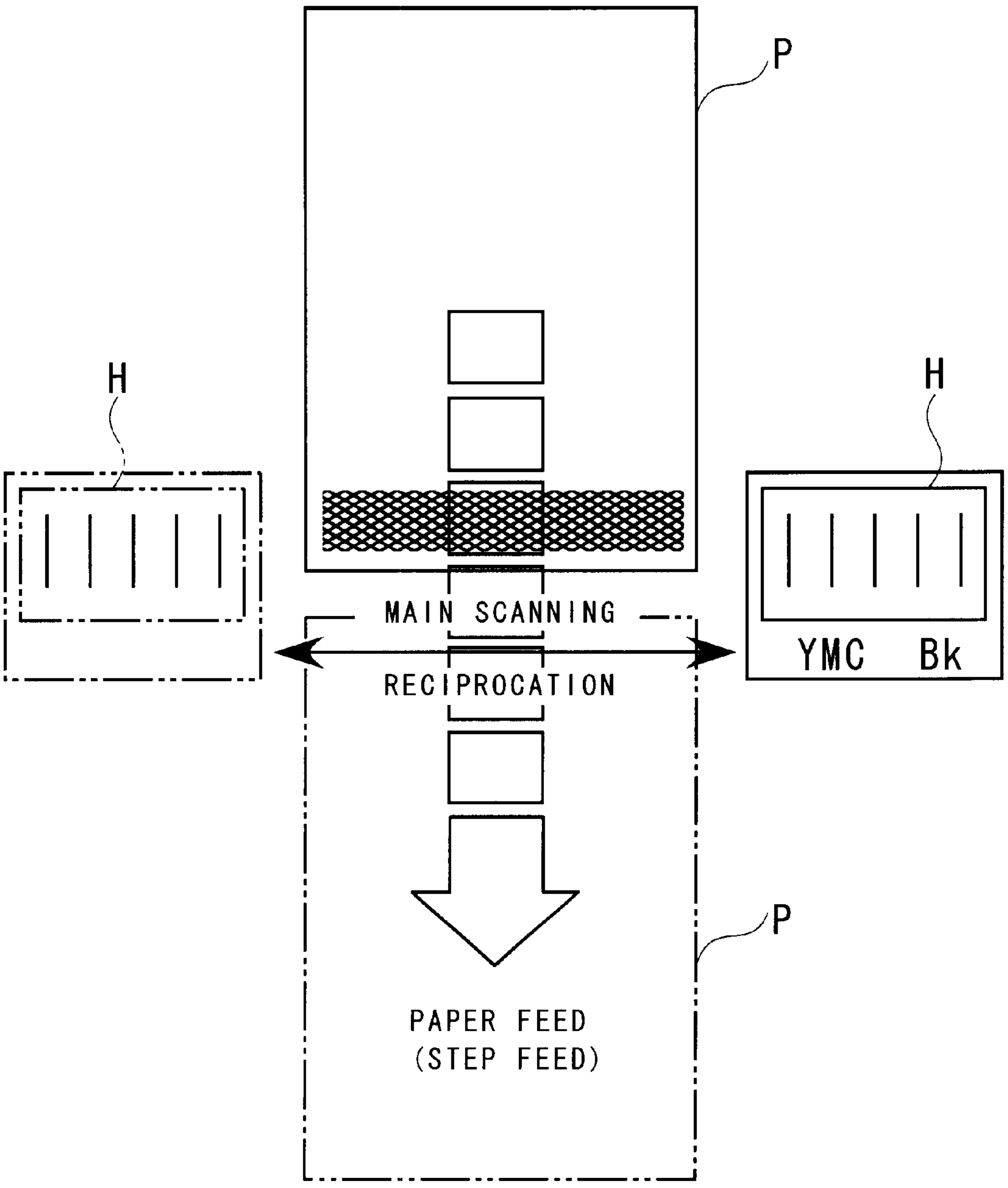
F I G. 1 5 PRIOR ART
FIG. 15 is an explanatory view schematically illustrating a printing method employed by the conventional ink jet printer.

FIG. 15 shows the conventional printing method, in which printing is carried out by intermittently feeding the printing paper P in one direction in synchronism with reciprocation of an ink jet head H in a printing area. More specifically, while the ink jet head H is caused to reciprocate in a main scanning direction for ejecting ink droplets, the printing paper P is intermittently fed in a sub scanning direction, whereby desired characters are printed at predetermined positions on the printing paper P.

Figure 6:
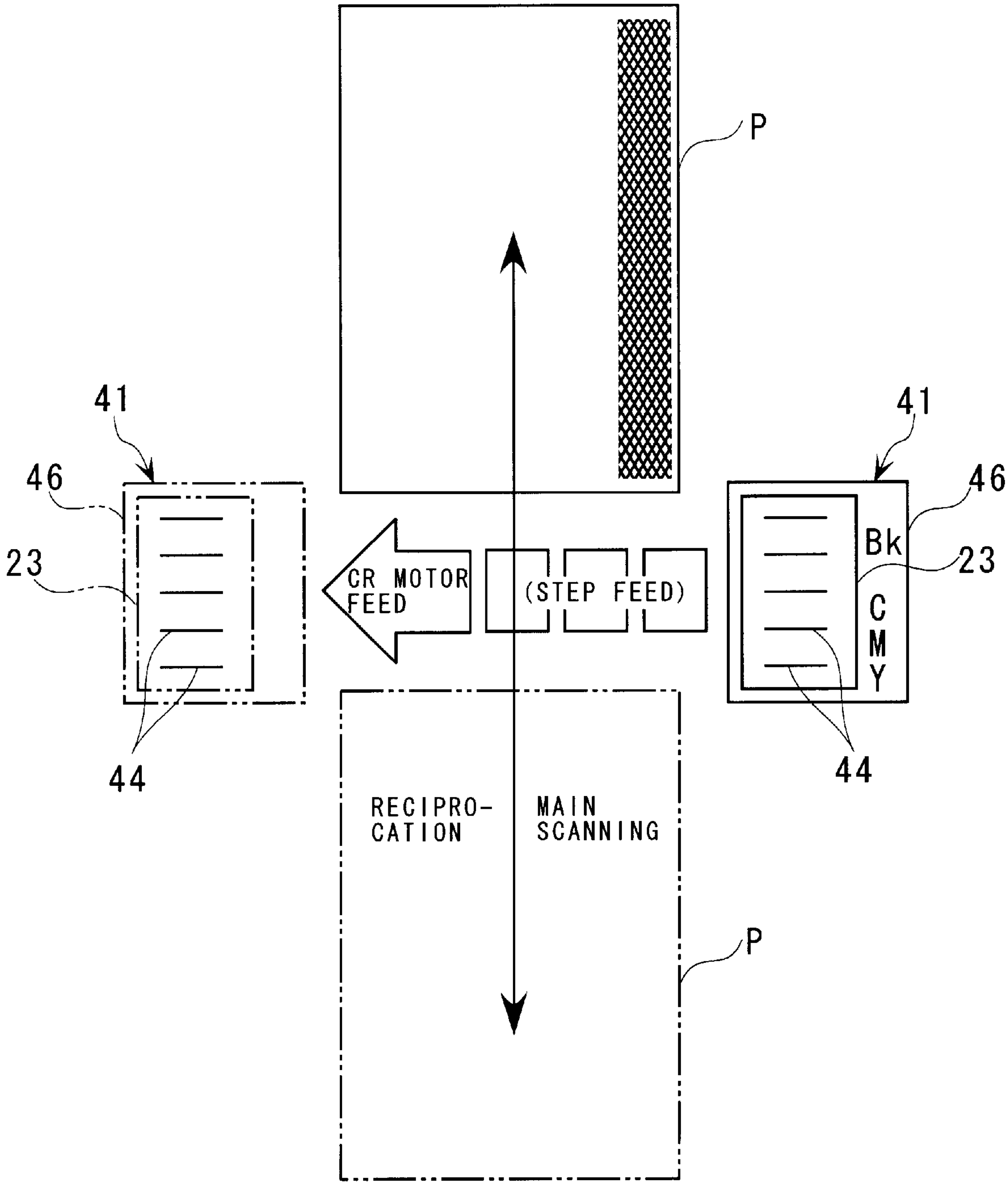
FIG. 6 is an explanatory view schematically illustrating a printing method employed by the tape printing apparatus.

FIG. 6 shows the printing method according to the present embodiment, in which printing is carried out by causing the ink jet head 23 to intermittently reciprocate in synchronism with reciprocation of a printing paper P in a printing area. More specifically, while the printing paper P is caused to reciprocate in a main scanning direction, the ink jet head 23 is intermittently moved in a sub scanning direction for ejecting ink droplets, whereby desired characters are printed at predetermined positions on the printing paper P. That is, printing is sequentially carried out on the printing paper P having a sufficiently larger width than the length of each of nozzle arrays 44, referred to hereinafter, in the direction of the width of the printing paper P.

As described above, inversely to the conventional method in which the ink jet head H is moved for main scanning, and the printing paper P is fed for sub scanning, in the printing method according to the present embodiment, the printing paper P is moved for main scanning, and the ink jet head 23 is moved for sub scanning, whereby printing is sequentially carried out along the width of the printing paper P. Consequently, in the printing method according to the present embodiment, characters are sequentially printed on a printing surface of the printing paper P such that a printed area of the printing surface filled with the printed characters increases in the direction of the length thereof, while in the conventional method, characters are sequentially printed on a printing surface of the printing paper P such that a printed area of the printing surface filled with the printed characters increases in the direction of the width thereof. Further, the arrangement of nozzle arrays 44 (direction of extension thereof) is orthogonal between the two methods, i.e. the arrangement of nozzle arrays 44 employed in one of the methods is in a direction rotated through 90 degrees from a direction of the arrangement of the same employed in the other.

When the printing tape T continuous in the direction of the length thereof is used as a printing medium, a distance over which the tape T reciprocates is set beforehand to feed the same such that it is reciprocatingly moved. Therefore, if a label to be produced has a length larger than the distance of reciprocation set beforehand, a printing surface of the label is divided into a plurality of printing areas for printing. Further, although in the printing method according to the present embodiment, printing is carried out (i.e. the ink jet head 23 is driven) only when the printing tape T is advanced toward the tape exit 7, this is not limitative, but it is possible to perform printing also when the printing tape T is moved rearward. Further, it is preferred that printing (ejection of ink droplets) can be carried out in either direction of the reciprocating motion of the ink jet head 23.

Next, the tape feed mechanism 21 for feeding the printing tape T such that it is reciprocatingly moved will be described. Referring to FIGS. 2 to 5, the tape feed mechanism 21 includes a feed motor, not shown, which is capable of performing rotations in normal and reverse directions, a reduction gear train 32 linked to the feed motor, and feed roller means 33 linked to the reduction gear train 32. The feed roller means 33 is comprised of forward feed roller means **33*a* and rearward feed roller means 33*b* arranged at respective downstream and upstream locations in the direction of feed of the printing tape T with respect to the ink jet head 23. Further, the respective forward and rearward feed roller means 33*a*, 33*b* are comprised of drive rollers 35*a*, 35*b*, and driven rollers 36*a*, 36*b***. Each pair of the drive and driven rollers are arranged in a manner opposed to each other with the printing tape T positioned therebetween.

The drive rollers **35*a*, 35*b* of the respective forward and rearward feed roller means 33*a*, 33*b* are arranged within the main unit 2, while the driven rollers 36*a*, 36*b* are arranged in the tape cartridge 10. More specifically, the drive rollers 35*a*, 35*b* are connected to the reduction gear train 32 for being simultaneously rotated by the feed motor. Further, the driven rollers 36*a*, 36*b* are rotatably mounted as free rollers with a cartridge casing 81 of the tape cartridge 10 (see FIG. 12). It should be noted that the driven rollers 36*a*, 36*b* may be provided in the main unit 2**.

Figure 7:
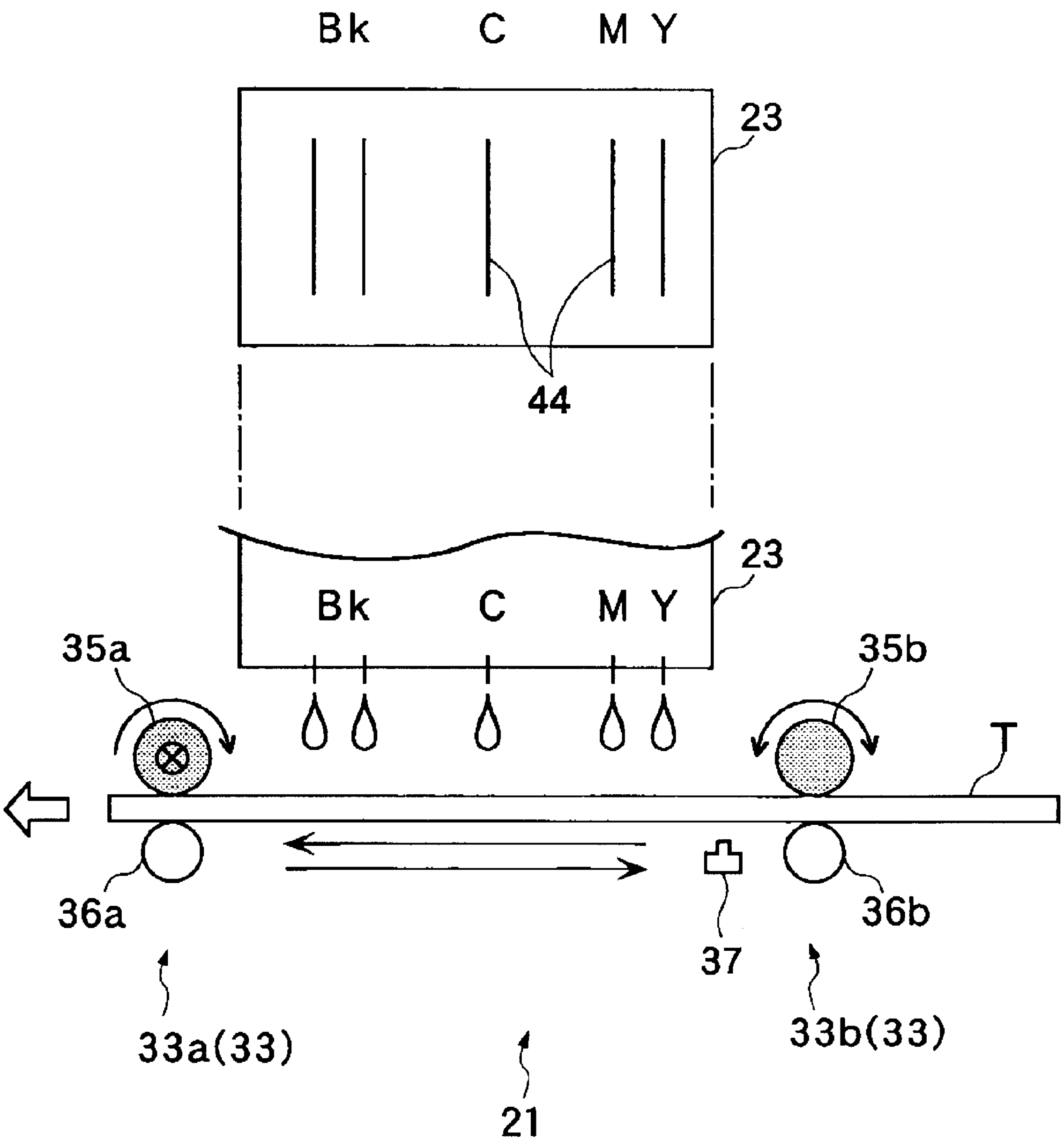
FIG. 7 is a side view schematically showing the relationship between a tape feed mechanism and an ink jet head.

As shown in FIG. 7, the drive roller **35*a* of the forward feed roller means 33*a* is formed of a so-called slip roller, and the drive roller 35*b* of the rearward feed roller means 33*b* is formed of a non-slip roller. The slip roller is configured such that it rotates slightly faster (in peripheral velocity) than the non-slip roller. Thus, the feeding of the printing tape T is controlled by the drive roller 35***b* performing non-slip rotation, of the rearward feed roller means 33*b,* and a fixed tension is applied to the printing tape T by the drive roller 35*a* performing slip rotation, of the forward feed roller means 33*a*. Further, the drive roller 35*a* of the forward feed roller means 33*a* incorporates a one-way clutch such that the drive roller 35*a* is driven for rotation when the printing tape T is moved forward, and permitted to freely rotate when the printing tape T is moved rearward.

In the figure, reference numeral 37 designates a leading edge-detecting sensor for detecting a position of a leading edge of the printing tape T fed such that it is reciprocatingly moved. This leading edge-detecting sensor 37 detects a position of a leading edge of the printing tape T with accuracy when the tape starts to be moved forward. This makes it possible to prevent a print-starting position from being displaced during a plurality of reciprocating printing operations.

Figure 8:
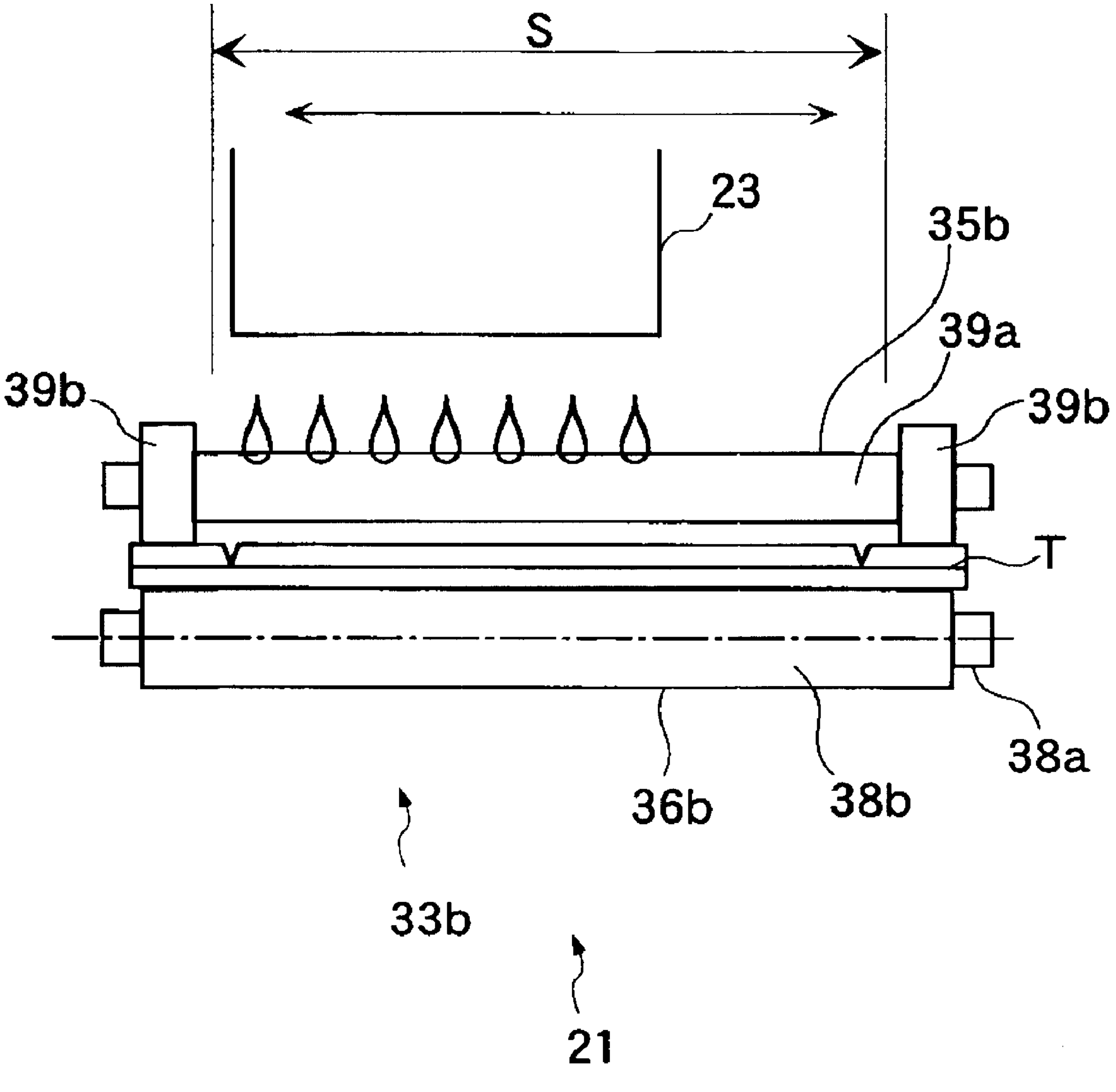
FIG. 8 is a front view schematically showing the relationship between the tape feed mechanism and the ink jet head.

FIG. 8 shows the relationship between the rearward feed roller means 33*b* and the ink jet head 23. The driven roller 36*b* of the rearward feed roller means 33*b* is comprised of a roller shaft 38*a,* and a roller body 38*b* rigidly fitted on the roller shaft 38*a* and having a width approximately corresponding to the tape width of the printing tape T. On the other hand, the drive roller 35*b* of the rearward feed roller means 33*b* is comprised of a roller shaft 39*a,* and a pair of roller bodies 39*b,* 39*b* each having a small width and rigidly fitted on opposite end portions of the roller shaft 39*a.*

The pair of roller bodies 39*b,* 39*b* are located outside a printing area S of the ink jet head 23, and brought into rolling contact with the printing tape T. More specifically, the above pair of roller bodies 39*b,* 39*b* are brought into rolling contact with portions of the printing tape T, corresponding to margins in the direction of the width of the printing tape T for being left unprinted, whereby when the printing tape T is fed such that it is reciprocatingly moved, the drive roller 35*b* brought into rolling contact with a recording or printing surface of the printing tape T can be kept from any contact with the portion of the printing tape T onto which ink is ejected. This makes it possible to prevent ink from adhering to the drive roller 35*b,* irrespective of whether or not the ink has been dried.

Although the driven roller 36*a* of the forward feed roller means 33*a* has the same shape as that of the driven roller 36*b* of the rearward feed roller means 33*b,* the drive roller 35*a* of the forward feed roller means 33*a* has a star-shaped roller body (star wheel) 39*b* arranged at an intermediate portion of the roller shaft 39*a* thereof. As described above, the drive roller 35*b* of the rearward feed roller means 33*b* predominantly controls the feeding of the printing tape T as a non-slip roller such that the tape T is reciprocatingly moved, and is configured such that the drive roller 35*b* is kept from any contact with a portion having ink droplets ejected thereon, of the recording surface of the printing tape T. Further, the drive roller 35*a* of the forward feed roller means 33*a* is constructed such that it is brought into contact with the recording surface of the printing tape T, as a slip roller, with a minimum contact area.

Next, the printing mechanism 22 will be described. Referring to FIGS. 2 to 5, the printing mechanism 22 is comprised of a head unit 41 carrying the ink jet head 23 thereon, and a unit-moving mechanism 42 for causing the head unit 41 to reciprocate in the vertical direction. The head unit 41 includes the ink jet head 23 (see FIG. 7) having five nozzle arrays 44 in an underside surface of a bottom thereof, an ink cartridge 45 for supplying cyan, magenta, yellow, and black inks to the ink jet head 23, and a carriage 46 holding the ink jet head 23 and for removably mounting the ink cartridge 45 therein.

As shown in FIG. 7, the unit-moving mechanism 42 is comprised of a pair of left and right carriage guide shafts 47, 47 supporting the head unit 41 such that the head unit 41 can be caused to reciprocate, a screw shaft 48 arranged on a rear side portion of the unit-moving mechanism 42, a gear train, not shown, for rotating the screw shaft 48, and a carriage motor, not shown, as a drive source which is capable of performing normal and reverse rotations. The screw shaft 48 extends through the carriage 46 in screw engagement therewith, whereby a screw mechanism is formed between the screw shaft 48 and an engagement portion of the carriage 46. More specifically, the screw shaft 48 is formed of an external thread, and the engagement portion of the carriage 46 is formed of an internal thread. When the carriage motor is driven for rotation, the screw shaft 48 is driven for normal or reverse rotation, whereby the headunit 41 is guided by the pair of carriage guide shafts 47, 47 to reciprocate in the vertical direction.

Although the ink jet head (head unit 41) 23 is caused to reciprocate (vertically moves) in the printing area corresponding to the width of the printing tape T during printing, the ink jet head 23 moves downward below the printing area to be brought to the waste ink disposal mechanism 27 when printing is not carried out, e.g. when a printing operation becomes idle or when the power is tuned off.

The waste ink disposal mechanism 27 is comprised of a wiper 51 for cleaning the ink jet head 23, a head cap 52 opposed to the ink jet head 23, a cap-moving mechanism 53 for moving the head cap 52 forward and rearward, a pump mechanism 54 for sucking waste ink in the head cap 52 and ink on the ink jet head 23. For instance, when a printing operation is idle, and before start of a printing operation or after termination of the same, the ink jet head 23 is brought to the head cap 52, for execution of so-called flushing. Further, e.g. when the power is tuned off, the head cap 52 is moved forward by the cap-moving mechanism 53 to be brought into intimate contact with the ink jet head 23 facing the same. Furthermore, if a predetermined time period elapses in this state before the power is turned on, the pump mechanism 54 is driven for suction of ink, and at the same time the wiper 51 is driven for wiping the nozzle surface of the ink jet head 23.

Next, the longitudinally-cutting cutter mechanism 24 will be described with reference to FIGS. 9 and 10. As shown in the figures, the longitudinally-cutting cutter mechanism 24 includes a pair of disk-shaped cutter blades 61, 61, a pair of cutter-holding members 62, 62 each holding each cutter blade 61, a support rod 63 supporting the pair of cutter-holding members 62, 62 such that each cutter-holding member 62 can be moved in a direction orthogonal to the direction of feed of the printing tape T, a cutting width adjustment mechanism 64 for moving the pair of cutter blades 61, 61 toward and away from each other via the cutter-holding members 62, 62.

The pair of cutter blades 61, 61 cut only a main tape of the printing tape T comprised of the main tape and a peel-off paper tape. More specifically, the blades 61, 61 perform half-cutting of the printing tape T at respective locations such that the printing tape T is cut in the direction of feed thereof (along the length of the printing tape T) to have a predetermined tape width defined by two parallel cut edges.

Each cutter-holding member 62 is comprised of a holding member body 66 on a root side, an arm portion 67 on an end side which is pivotally mounted on the holding member body 66, and a torsion coiled spring 68 arranged between the holding member body 66 and the arm portion 67. The cutter blade 61 is attached to the end of the arm portion 67 such that it can be rotated brakingly against the printing tape T. More specifically, as the tape T is advanced, the cutter blade 61 struck against thereon performs half-cutting thereof while being rotated brakingly on the tape T. Further, the support rod 63 is in the form of a spline shaft, and the holding member body 66 has a root for spline engagement with the support rod 63 in an axially slidable manner.

The upper cutter-holding member 62 has the arm portion 67 fixedly attached to an interlock bar 69 which extends toward the lower arm portion 67. The interlock bar 69 abuts on a back surface of the lower arm portion 67. Further, the interlock bar 69 has a lower portion attached to a cam block 71 having a cam slope 71a. When the head unit 41 is brought to the waste ink disposal mechanism 27, as described hereinabove, it has an actuating projection 72 thereof brought into abutment with the cam block 71 to cause the cutter blade 61 to be pressed against the printing tape T via the interlock bar 69 by cam action on the cam slope 71*a* (see FIG. 10). It should be noted that arranged on a reverse side of the printing tape T shown in the figure is a reception plate 73 for sandwiching the printing tape T between the same and the cutter blade 61 (see FIG. 2).

Each arm portion 67 is pivotally urged by the torsion coiled spring 68 such that the cutter blade 61 is moved away from the printing tape T. More specifically, when the head unit 41 has been moved to a location remote from the waste ink disposal mechanism 27 e.g. during printing, both of the cutter blades 61, 61 have been moved to a wait position spaced from the printing tape T by action of the torsion coiled spring 68, whereas when the head unit 41 has been moved to the position of the waste ink disposal mechanism 27 e.g. after termination of a printing operation, both of the cutter blades 61, 61 are moved to a cutting position (half-cutting position) for cutting the printing tape T, by the cam action of the cam block 71.

An upper rack 74 is attached to the holding member body 66 of the upper cutter-holding member 62 in parallel with the support rod 63. Similarly, to the holding member body 66 of the lower cutter-holding member 62 is attached a lower rack 75 which protrudes from the holding member body 66, and then bends upward to extend in parallel with the support rod 63. The upper rack 74 and the lower rack 75 are arranged in a manner opposed to each other such that they mate with a pinion 76 interposed therebetween, and rotation of the pinion 76 causes the upper cutter-holding member 62 and the lower cutter-holding member 62 to be moved toward or away from each other simultaneously such that they are each moved by an equal distance.

A motor is provided as a drive source of the cutting width adjustment mechanism 64, though not explicitly shown, and the pinion 76 is driven by this motor for normal or reverse rotation, whereby the distance between the cutter blades 61, 61 (cutting width) is adjusted. In this embodiment, the cutting width of the printing tape T to be adjusted by the cutting width adjustment mechanism 64 can be set via the keyboard 4, by switching to a mode therefor and then inputting a numerical value or selecting the same. Further, when the printing tape T is printed with background colors or the like, if the printing width is set to be larger than a cutting width, it is possible to obtain an excellent cut-off strip of the tape T with ink painted all over. Further, the cutting width adjustment mechanism 64 may be configured such that the cutting width can be manually adjusted e.g. by providing the lower rack 75 with a pull tab or the like for operating the same with fingers. In such a case, the pinion 76 is rotatably attached to the apparatus frame 28 or the like.

After series of printing has been completed, first, the cutting width adjustment mechanism 64 is driven such that the cutter blades 61, 61 are moved toward or away from each other to be positioned at a predetermined distance (cutting width), and at the same time the head unit 41 is moved downward to the location of the waste ink disposal mechanism 27. When the head unit 41 stops at this downward end position, the cutter blades 61, 61 are pivotally moved by cam action to abut on the printing tape T, and a cutting wait state is enabled and maintained. Next, the tape feed mechanism 21 is driven to advance the printing tape T toward the tape exit 7. Here, a printed portion of the printing tape T is half-cut by interaction between feed of the printing tape T and rotation of the cutter blade 61. After that, the tape feed mechanism 21 stops, and then the transversely-cutting cutter mechanism 25 is driven for fully cutting the printed portion of the printing tape T subjected to the half-cutting, thereby cutting off the same.

It should be noted that the cutter blades 61, 61 of the longitudinally-cutting cutter mechanism 24 may be formed by a single cutter blade that can be positioned to half-cut the printing tape T at a location laterally spaced from one end of the tape T to thereby form a cut strip having a predetermined width. Further, slanting blades may be used in place of the disk-shaped cutter blades. Of course, the longitudinally-cutting cutter mechanism 24 may be constructed such that the disk-shaped cutter blades are rotated by using a driving force of a motor for performing a half-cutting operation. Still further, the cutting width adjustment mechanism 64 may be implemented by a screw mechanism in place of the above racks and pinion.

Figure 9:
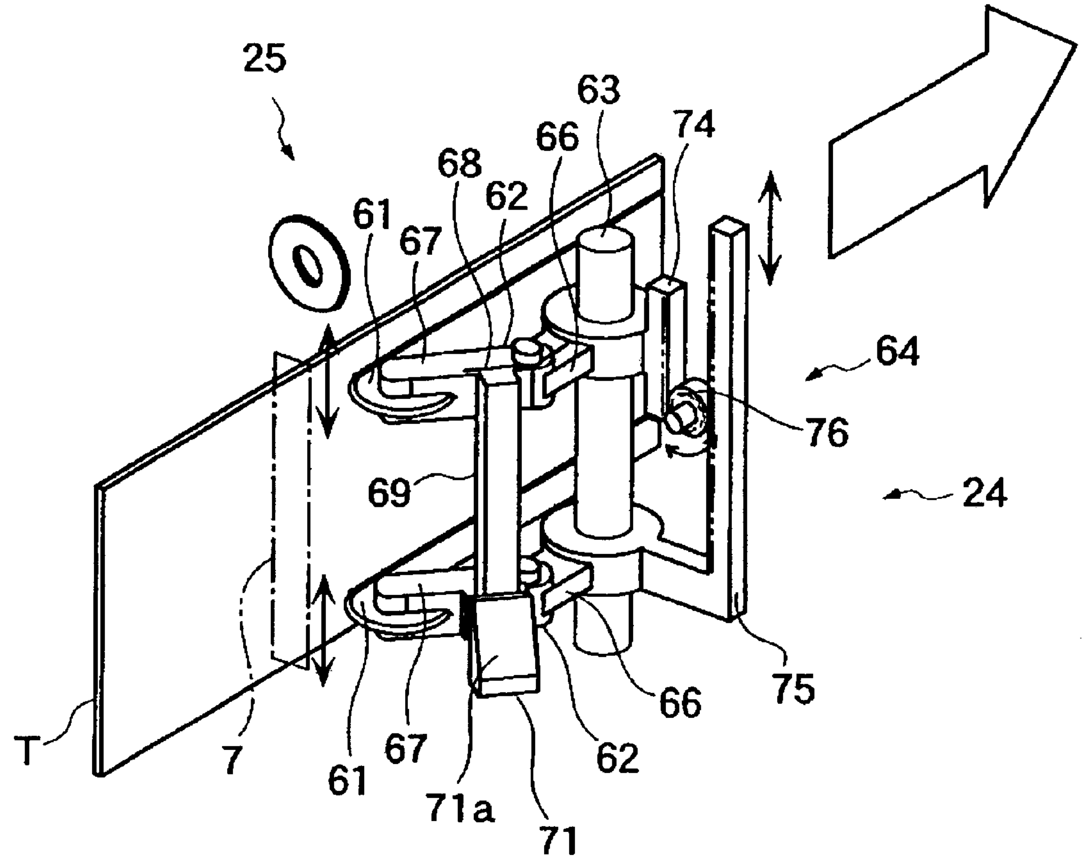
FIG. 9 is a perspective view of a longitudinally-cutting cutter mechanism and a transversely-cutting cutter mechanism.
Figure 10:
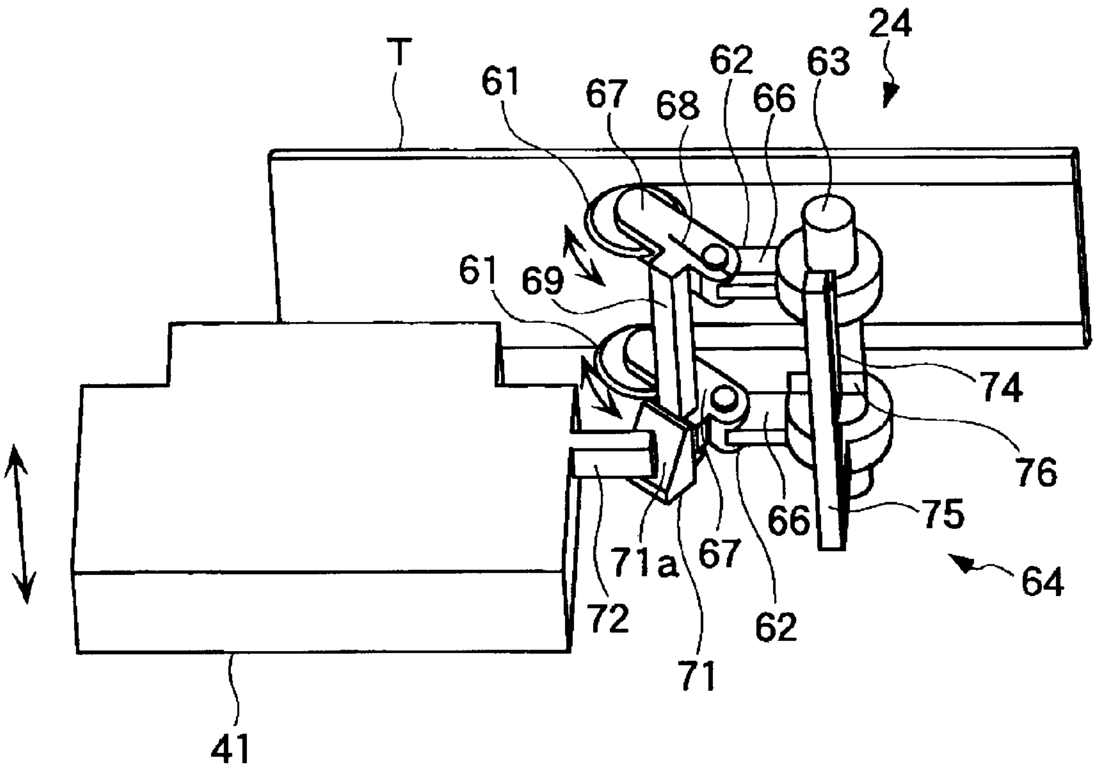
FIG. 10 is a perspective view showing the relationship between the longitudinally-cutting cutter mechanism and a head unit.

The transversely-cutting cutter mechanism 25, schematically shown in FIG. 9, is formed by a so-called rotary cutter, and arranged at a location immediately close to the longitudinally-cutting cutter mechanism 24 on the downstream side in the direction of feed of the printing tape T. Further, the tape exit 7 is positioned at a location immediately close to the transversely-cutting cutter mechanism 25 on the downstream side. It should be noted that the transversely-cutting cutter mechanism 25 may be constructed by a cutter mechanism including a cutter in the form of scissors irrespective of whether it cuts off a printed portion of the printing tape T manually or automatically, in place of the rotary cutter. Further, the transversely-cutting cutter mechanism 25 may be arranged at a location upstream of the longitudinally-cutting cutter mechanism 24 in the direction of feed of the printing tape T.

Figure 11:
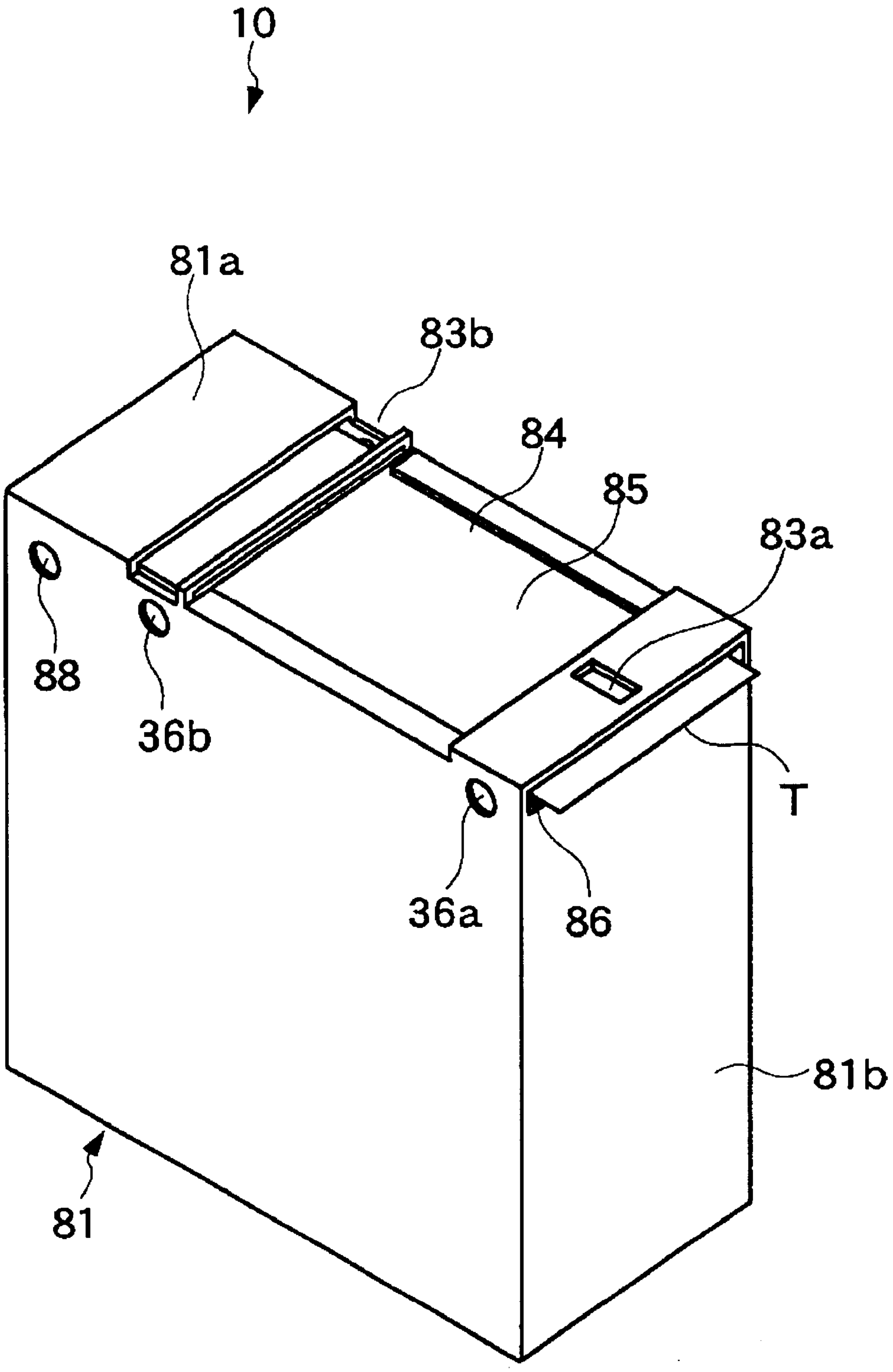
FIG. 11 is a perspective view of an appearance of a tape cartridge.
Figure 12:
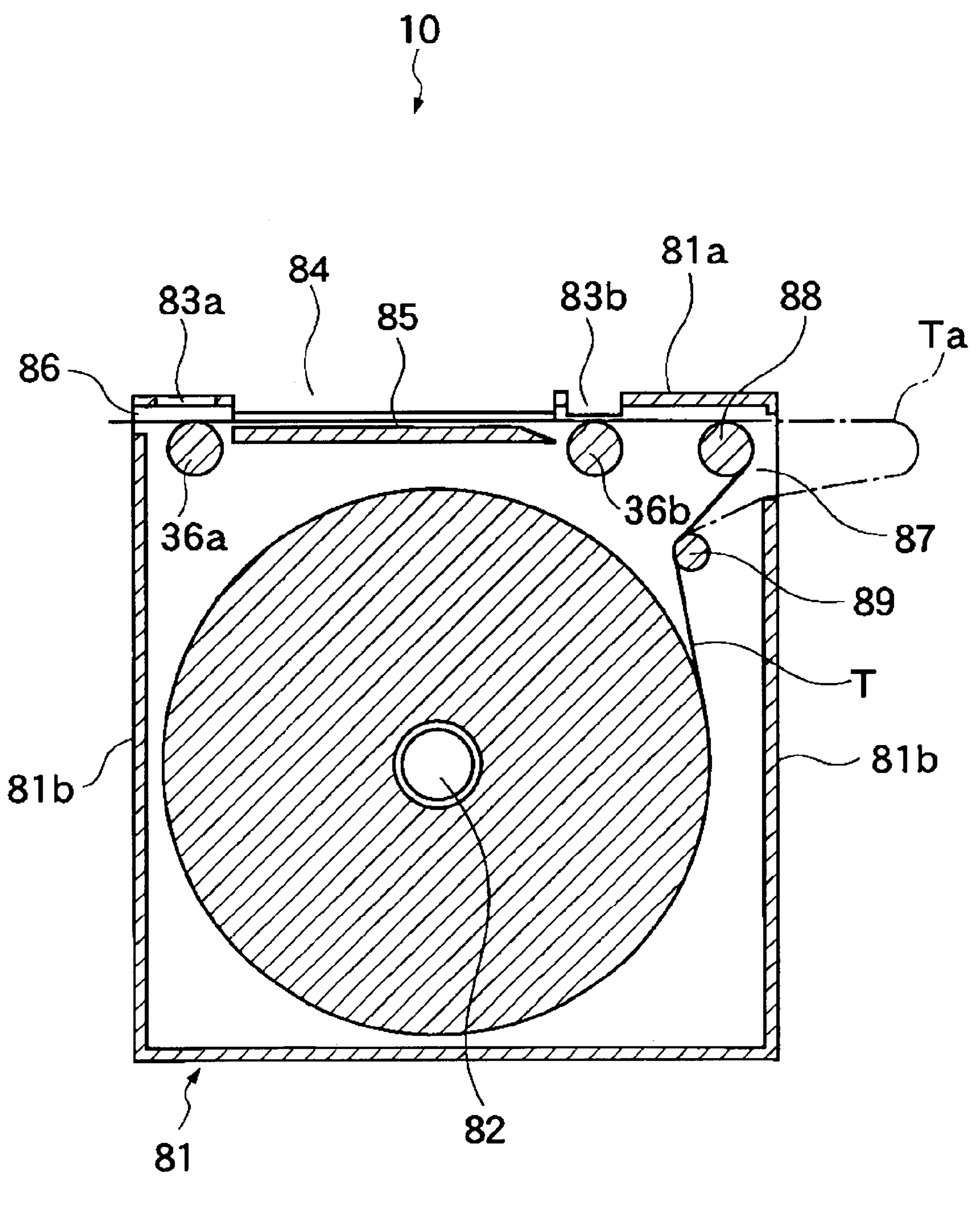
FIG. 12 is a sectional view of an internal construction of the tape cartridge.

Next, the tape cartridge 10 and the buffer 26 will be described. Referring to FIGS. 11 and 12, the tape cartridge 10 is comprised of a printing tape T wound around the tape core 82, and the cartridge casing 81 in the form of a box accommodating the printing tape T. Further, the two driven rollers 36*a*, 36*b* of the respective forward and rearward feed roller means 33*a*, 33*b* are rotatably contained in the cartridge casing 81. The cartridge casing 81 has a front wall 81*a* toward which the driven rollers 36*a*, 36*b* face. The front wall 81*a* is formed with two roller openings 83*a*, 83*b* toward which the above-mentioned drive rollers 35*a*, 35*b* face. Formed between the two roller openings 83*a*, 83*b* is a head opening 84 to which the ink jet head 23 is brought, and inside the head opening 84 is formed a guide wall 85 for guiding a tape feeding operation for feeding the printing tape T.

The cartridge casing 81 has side walls 81*b,* 81*b,* one formed with a tape-sending slit 86 located forward of the driven roller 36*a* of the forward feed roller means 33*a,* and the other formed with a tape escape opening 87 located rearward of the driven roller 36*b* of the rearward feed roller means 33*b*. Further, a guide roller (guide member) 88 is arranged in a manner facing toward the tape escape opening 87, and in the vicinity of the guide roller 88 is provided a guide pin 89. The printing tape T, after having a feeding path thereof changed in direction by the guide pin 89 and the guide roller 88 within the cartridge casing 81, is brought into rolling contact with the driven rollers 36*b,* 36*a,* and then rolled out from the tape-sending slit 86 toward the tape exit 7.

The two driven rollers 36*a,* 36*b,* and the guide roller 88 are positioned approximately in a straight line, and the tape escape opening is formed at a location on the extension of the straight line. Therefore, when the printing tape T is fed or moved rearward in the upstream direction, a returned portion Ta of the printing tape T is sent out of the tape cartridge 10 via the tape escape opening 87, without being taken up by the tape core 82. As shown in FIGS. 3 and 4, arranged outside the tape cartridge 10 is the buffer 26 facing the tape escape opening 87, and hence the returned portion Ta is sent into the buffer 26 through the tape escape opening 87.

The buffer 26 is U-shaped in cross section, and extends along the above straight line. The buffer 26, not shown in FIG. 1, projects outward from the buffer slit 8 of the apparatus casing 3. The returned portion Ta of the printing tape T is fed out of and into the buffer 26 in accordance with respective forward and rearward movements of the printing tape T, forming the shape of the letter U. It should be noted that a mounting block of the tape cartridge 10 comprised of a base plate and side plates is omitted in the drawings.

Figure 13:
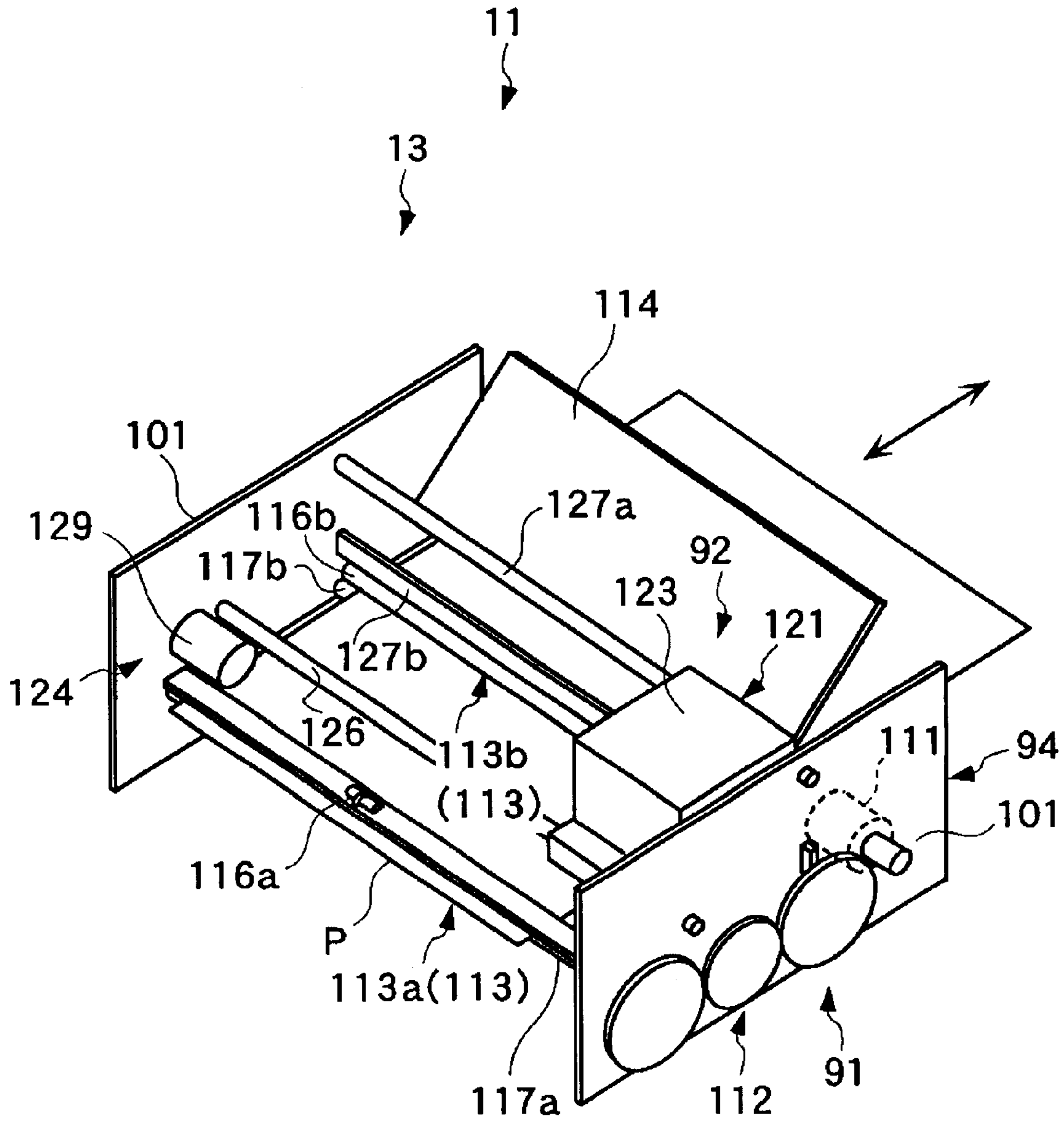
FIG. 13 is a perspective view of a main mechanism block of an ink jet printer according to another embodiment of the invention.
Figure 14:
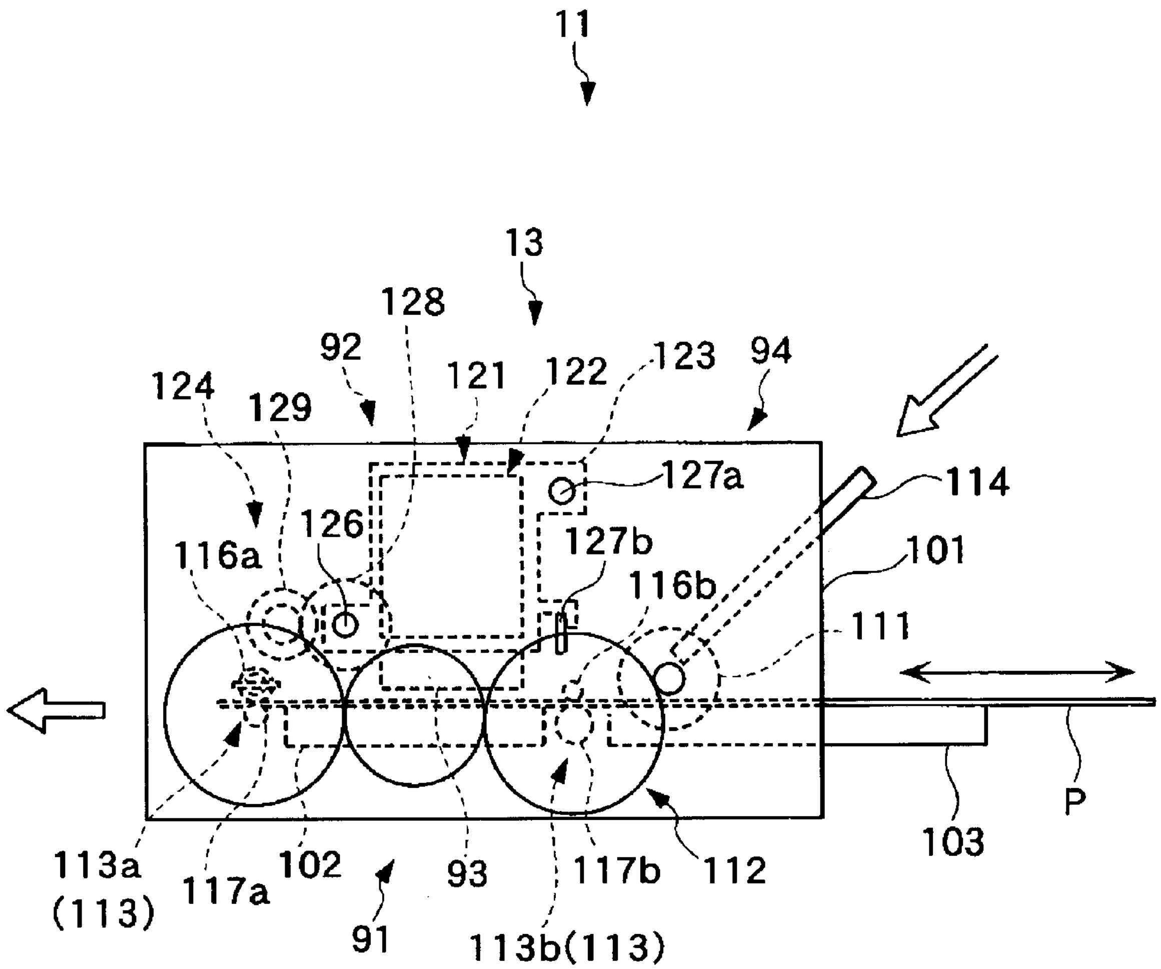
FIG. 14 is a side view of the main mechanism block of the ink jet printer according to the other embodiment.

Next, an ink jet printer according to another embodiment of the invention to which is applied the printing method of the invention will be described with reference to FIGS. 13 and 14. This ink jet printer 11 uses a printing paper P as a recoding (printing) medium. Here, only a main mechanism block 13 thereof is described. As shown in the figures, the main mechanism block 13 is comprised of a paper feed mechanism 91 for feeding the printing paper P, a printing mechanism 92 including an ink jet head 93 for carrying out printing on the printing paper P by the ink jet printing method, a waste ink disposal mechanism, not shown, to which the ink jet head 93 is brought, and a block frame 94 supporting the above devices thereon.

The block frame 94 is comprised of a pair of left and right side plates 101, 101, a guide plate 102 arranged between the side plates 101, 101, and a buffer plate 103. The guide plate 102 horizontally extends between forward and rearward feed roller means 113*a,* 113*b,* referred to hereinafter, and at the same time is arranged in a manner facing the ink jet head 93 so as to guide a feeding operation for feeding the printing paper P for use in printing. The buffer plate 103 horizontally extends rearward of the rearward feed roller means 113*b,* and at the same time the top surface thereof is arranged at the same level as that of the guide plate 102 in order to receive the printing paper P when it is moved rearward.

The paper feed mechanism 91 includes a feed motor 111 which is capable of performing rotations in the normal and reverse directions, a reduction gear train 112 connected to the feed motor 111, feed roller means 113 connected to the reduction gear train 112, and a paper feed plate 114 for carrying the printing paper P. The feed roller means 113 is comprised of forward feed roller means 113a and rearward feed roller means 113*b* arranged at respective downstream and upstream locations in the direction of feed of the printing paper P with respect to the ink jet head 93. Further, the respective forward and rearward feed roller means 113*a,* 113*b* are comprised of driven rollers 116*a,* 116*b* positioned above, and drive rollers 117*a,* 117*b* positioned below. Each pair of the drive and driven rollers are arranged in a manner opposed to each other with the printing tape T therebetween.

Each of the drive rollers 117*a,* 117*b* is supported by the left and right side plates 101, 101, and linked to the reduction gear train 112 arranged outside one (on a right-hand side as viewed in the figures) of the side plates, for being driven for rotation by a driving force of the feed motor 111 that is arranged inside the one side plate. In this embodiment as well, the forward feed roller means 113*a* is formed by a slip roller incorporating a one-way clutch, while the rearward feed roller means 113*b* is formed by a non-slip roller.

The paper feed plate 114 is arranged such that it extends forward and downward toward the rearward feed roller means 113*b*. The paper feed plate 114 has a paper feed roller, not shown, arranged at a location above the front portion thereof such that rotation of the paper feed roller causes a stack of printing papers P to be fed one by one from the paper feed plate 114 to the rearward feed roller means 113*b*. It should be noted that the ink jet printer may be configured such that a paper feed cassette for holding printing papers P to be fed removably mounted therein, in place of the paper feed plate 114.

The printing mechanism 92 is comprised of a head unit 121 including the ink jet head 93, an ink cartridge 122, and a carriage 123, and a unit-moving mechanism 124 for causing the head unit 121 to reciprocate in the direction of the width of a printing paper P. The unit-moving mechanism 124 is comprised of a screw shaft 126 arranged between the side plates 101, 101 on a front side of the main mechanism block 13, a guide shaft 127*a* and a guide bar 127*b* arranged between the side plates 101, 101 on a rear side of the main mechanism block 13, a gear train 128 for rotating the screw shaft 126, and a carriage motor 129 as a drive source which is capable of performing normal and reverse rotations. The head unit 121 is supported for reciprocating motion by the screw shaft 126 extending through a lower front portion of the carriage 123, the guide shaft 127*a* extending through an upper rear portion of the carriage 123, and the guide bar 127*b* slidably caught at a lower rear portion of the carriage 123. In this embodiment as well, as crew mechanism is formed between the screw shaft 126 and an engagement portion of the carriage 123. The normal or reverse rotation of the carriage motor 129 causes normal or reverse rotation of the screw shaft 1126, whereby the head unit 121 is caused to reciprocate in the direction of the width of the printing paper P.

As described hereinabove, according to the above embodiments, a printing tape T or a printing paper P is fed such that it is reciprocatingly moved, and simultaneously the inkjet head 23 or 93 is intermittently moved in a direction orthogonal to the direction of feed of the printing tape T or the printing paper P, whereby printing is carried out. More specifically, the printing medium T or P is used for main scanning, and the ink jet head 23 or 29 is used for sub scanning to thereby carry out a sequential printing operation by the ink jet printing method. Hence, the printing speed can be controlled by using the speed of reciprocating motion of the printing medium T or P which predominates the printing speed. Since the printing medium T or P is very light in weight, the speed of reciprocating motion thereof can be enhanced relatively easily, whereby it is possible to increase the printing speed with ease.

Further, the reciprocating motion of the recording medium T or P light in weight enables energy consumption to be reduced in comparison with a case in which the ink jet head 23 or 93 is caused to reciprocate at high speed. Furthermore, since there is no need to cause the ink jet head 23 or 93 to reciprocate at high speed, it is not necessary to provide large acceleration and deceleration regions to overcome inertia, which makes it possible to reduce the space within which the ink jet head 23 or 93 is moved. In short, it is possible to construct a power saving printer while designing the same compact in size.

It is further understood by those skilled in the art that the foregoing are preferred embodiments of the invention, and that various changes and modification may be made without departing from the spirit and scope thereof.

What is claimed is:

1. A method of sequentially printing on a printing medium having a printing area whose width is sufficiently larger than a length of nozzle arrays of a print head of a serial printer, along a width of said printing medium, by said nozzle arrays extending in a direction of said width of said printing medium, wherein said printing on said printing medium is carried out while feeding said printing medium such that said printing medium is reciprocatingly moved, and at the same time intermittently moving said print head facing said printing medium in said direction of said width of said printing medium, said direction being orthogonal to a direction of feed of said printing medium.

2. A method according to claim 1, wherein said printing by using said print head of a serial printer is carried out not only when said printing medium is moved forward but also when said printing medium is moved rearward.

3. A method according to claim 1, wherein said print head of a serial printer is caused to reciprocate over said printing area, and said printing is carried out not only when said print head is moved forward but also when said print head is moved rearward.

4. A printing method according to claim 1, wherein said printing medium is a printing tape which is stored in a form of a roll and rolled out for said printing.

5. A serial ink jet printer comprising:

a printing medium feed mechanism for feeding a printing medium having a printing area upon which printing is carried out, such that said recording medium is reciprocatingly moved;

a print head of said serial ink jet printer having nozzle arrays extending in a direction of a width of said printing medium, and being brought to said printing medium whose width is sufficiently larger than a length of said nozzle arrays, for sequentially printing thereon along said width of said printing medium, by said nozzle arrays; and a head-moving mechanism for intermittently moving said print head in said direction of said width of said printing medium, said direction being orthogonal to a direction of feed of said printing medium, wherein said printing is carried out by causing said printing medium to be reciprocatingly moved and at the same time causing said print head to be intermittently moved.

6. A serial ink jet printer according to claim 5, wherein said printing medium feed mechanism includes forward feed roller means and rearward feed roller means arranged at respective downstream and upstream locations in said direction of feed of said printing medium with respect to said print head, and wherein said forward feed roller means is configured such that said forward feed roller means rotates slightly faster than said rearward feed roller means, and is permitted to perform slip rotation when said printing medium is moved forward, and at the same time to perform free rotation when said printing medium is moved rearward.

7. A serial ink jet printer according to claim 6, wherein said rearward feed roller means includes a drive roller and a driven roller opposed to each other with said printing medium positioned therebetween, and wherein out of said drive roller and said driven roller, one roller positioned on a recording surface side of said printing medium has a pair of roller bodies which are located outside said printing area, and brought into direct contact with said printing medium.

8. A serial ink jet printer according to claim 7, further including a longitudinally-cutting cutter for cutting said printing medium for which said printing has been completed, at a location inward of a portion of said printing medium with which said pair of roller bodies are brought into rolling contact, along said direction of feed of said printing medium.

9. A serial ink jet printer according to claim 8, wherein said longitudinally-cutting cutter has a pair of cutter blades, said pair of cutter blades being constructed such that a distance therebetween can be adjusted.

10. A serial ink jet printer according to claim 8, wherein said printing medium has an adhesive layer coated on a reverse side surface opposite to said recording surface and a peel-off paper provided on said adhesive layer, wherein said longitudinally-cutting cutter performs half-cutting of said printing medium such that said peel-off paper is left uncut.

11. A serial ink jet printer according to claim 5, including a carriage having said print head installed thereon and wherein said head-moving mechanism has a screw shaft in screw engagement with said carriage, a guide shaft in slidable engagement with said carriage, and a motor for rotating said screw shaft.

12. A serial ink jet printer according to claim 5, further including a buffer for receiving a returned portion of said printing medium when said printing medium is moved rearward.

13. A serial ink jet printer according to claim 5, wherein said printing medium is a printing tape which is stored in a form of a roll and rolled out for said printing.

14. A serial ink jet printer according to claim 13, further including a tape cartridge containing said printing tape, said tape cartridge being removably mounted in said ink jet printer.

15. A tape cartridge removably mounted in a serial ink jet printer that carries out printing by feeding a printing tape such that said printing tape is reciprocatingly moved, and at the same time by intermittently moving a print head facing said printing tape in a direction orthogonal to a direction of reciprocation of said printing tape, the tape cartridge comprising a cartridge casing accommodating said printing tape in a form of a roll.

16. A tape cartridge according to claim 15, wherein said cartridge casing is formed with an opening for allowing a returned portion of said printing tape to escape from within said cartridge casing when said printing tape is moved rearward.

17. A tape cartridge according to claim 16, wherein said cartridge casing is provided with a guide member for guiding said returned portion of said printing tape out of said cartridge casing through said opening.

18. A tape cartridge according to claim 15, wherein said printing tape is fed such that said printing tape is reciprocatingly moved by tape feed roller means having a drive roller and a driven roller, and wherein said cartridge casing contains said driven roller.

19. A tape cartridge according to claim 18, wherein said tape feed roller means comprises forward feed roller means and rearward feed roller means arranged at respective downstream and upstream locations in a direction of feed of said printing tape with respect to said print head, said forward feed roller means and said rearward feed roller means each comprising said drive roller and said driven roller arranged in a manner opposed to each other with said printing tape sandwiched therebetween.

20. A method of sequentially printing on a printing medium having a printing area whose width is sufficiently larger than a length of nozzle arrays of a print head of a serial printer, along a width of said printing medium, the method comprising the steps of:

extending said nozzle arrays in a direction of said width of said printing medium; and carrying out said printing on said printing medium while feeding said printing medium such that said printing medium is reciprocatingly moved based on the length of nozzle arrays of a print head, and at the same time intermittently moving said print head facing said printing medium in said direction of said width of said printing medium, said direction being orthogonal to a direction of feed of said printing medium.

21. A serial ink jet printer comprising:

a printing medium feed mechanism for feeding a printing medium having a printing area upon which printing is carried out, such that said recording medium is reciprocatingly moved;

a print head of said serial ink jet printer having nozzle arrays extending in a direction of a width of said printing medium, and being brought to said printing medium whose width is sufficiently larger than a length of said nozzle arrays, for sequentially printing thereon along said width of said printing medium, by said nozzle arrays; and a head-moving mechanism for intermittently moving said print head in said direction of said width of said printing medium, said direction being orthogonal to a direction of feed of said printing medium;

wherein said printing is carried out by causing said printing medium to be reciprocatingly moved based on the length of the nozzle array of the print head and at the same time causing said print head to be intermittently moved.

* * * * *